(12) United States Patent
Shirataki et al.

(10) Patent No.: US 6,640,948 B2
(45) Date of Patent: Nov. 4, 2003

(54) ONE-WAY CLUTCH APPARATUS

(75) Inventors: Hirobumi Shirataki, Fukuroi (JP); Tomoharu Ando, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/196,200

(22) Filed: Jul. 17, 2002

(65) Prior Publication Data
US 2003/0015389 A1 Jan. 23, 2003

(30) Foreign Application Priority Data
Jul. 19, 2001 (JP) ........................ 2001-218908

(51) Int. Cl.⁷ .................. F16D 41/067; F16D 13/74
(52) U.S. Cl. ..................... 192/45; 192/113.32
(58) Field of Search .................. 192/45, 113.32

(56) References Cited
U.S. PATENT DOCUMENTS

| | | | | |
|---|---|---|---|---|
| 4,782,931 A | * | 11/1988 | Lederman | 192/113.32 |
| 5,029,688 A | * | 7/1991 | Hayakawa et al. | 192/113.32 |
| 5,638,936 A | * | 6/1997 | Kinoshita et al. | 192/113.32 |
| 5,687,826 A | * | 11/1997 | Kinoshita et al. | 192/113.32 |
| 6,044,945 A |  | 4/2000 | Muramatsu |  |
| 6,092,636 A |  | 7/2000 | Muramatsu |  |
| 6,338,402 B1 |  | 1/2002 | Muramatsu et al. |  |
| 6,530,464 B2 | * | 3/2003 | Ogata et al. | 192/113.32 |

* cited by examiner

*Primary Examiner*—Rodney H. Bonck
(74) *Attorney, Agent, or Firm*—Crowell & Moring LLP

(57) ABSTRACT

A one-way clutch apparatus is provided with a plurality of rollers interposed as torque-transmitting members between an inner ring and an outer ring and a cam surface formed on an outer peripheral wall of said inner ring such that by a combination of the cam surface and the rollers, transmission of rotating force is performed only in one direction between the inner ring and the outer ring. An inner side wall of a flange of a retainer, said flange being arranged alongside the rollers and inner ring, is provided on a radially inner side thereof with an annular recess. An outer peripheral end wall of the annular recess is located on a radially outer side of the cam surface of the inner ring only at deepest parts of the cam surface to permit supply of lube oil to the rollers through the annular recess of the flange and the deepest parts of the cam surface.

2 Claims, 6 Drawing Sheets

ONE-WAY CLUTCH APPARATUS

BACKGROUND OF THE INVENTION a) Field of the Invention

This invention relates to a one-way clutch apparatus useful in an automatic transmission mechanism or the like for an automobile, and especially to a one-way clutch apparatus which makes use of rollers as torque-transmitting members and can stabilize support of the torque-transmitting members and can surely establish a lube oil supply passage.

b) Description of the Related Art

FIG. 8 is a cross-sectional view of a conventional sprag-type one-way clutch 10, and illustrates an inner ring 2, an outer ring 3, an end bearing 45, a lock plate 46, a snap ring 47, sprags 50, and oilways 25 bored through the inner ring 25. Such a conventional apparatus develops inconvenience in retaining its strength because the oilways and the sprags undergo sliding contact with each other.

Especially in a roller-type one-way clutch making use of rollers as torque-transmitting members, it was therefore contemplated to provide a flange of a retainer with an oil passage or oil groove such that lube oil would be applied sideward to the rollers. This design is, however, unavoidably accompanied by inconvenience such that precision machining of the flange is difficult and in some instances, the rollers may be caught by the oil groove in an inner wall of the flange.

SUMMARY OF THE INVENTION

An object of the present invention is to provide a one-way clutch apparatus either free of or lessened in the above-described inconvenience of the conventional one-way clutch apparatuses.

The above-described object of the present invention can be achieved by a one-way clutch apparatus provided with a plurality of rollers interposed as torque-transmitting members between an inner ring and an outer ring and a cam surface formed on an outer peripheral wall of the inner ring such that by a combination of the cam surface and the rollers, transmission of rotating force is performed only in one direction between the inner ring and the outer ring, wherein an inner side wall of a flange of a retainer, said flange being arranged alongside said rollers and inner ring, is provided on a radially inner side thereof with an annular recess, and an outer peripheral end wall of the annular recess is located on a radially outer side of the cam surface of the inner ring only at deepest parts of the cam surface to permit supply of lube oil to the rollers through the annular recess of the flange and the deepest parts of the cam surface.

The annular recess can be machined with extreme ease as the annular recess is arranged on the radially inner side of the inner side wall of the flange of the retainer. It is also possible to surely establish a lube oil supply passage while stabilizing support of the torque-transmitting members because the outer peripheral end wall of the annular recess is located on a radially outer side of the cam surface of the inner ring only at the deepest parts of the cam surface.

DETAILED DESCRIPTION OF THE PREFERRED EMBODIMENT

Figure 1:
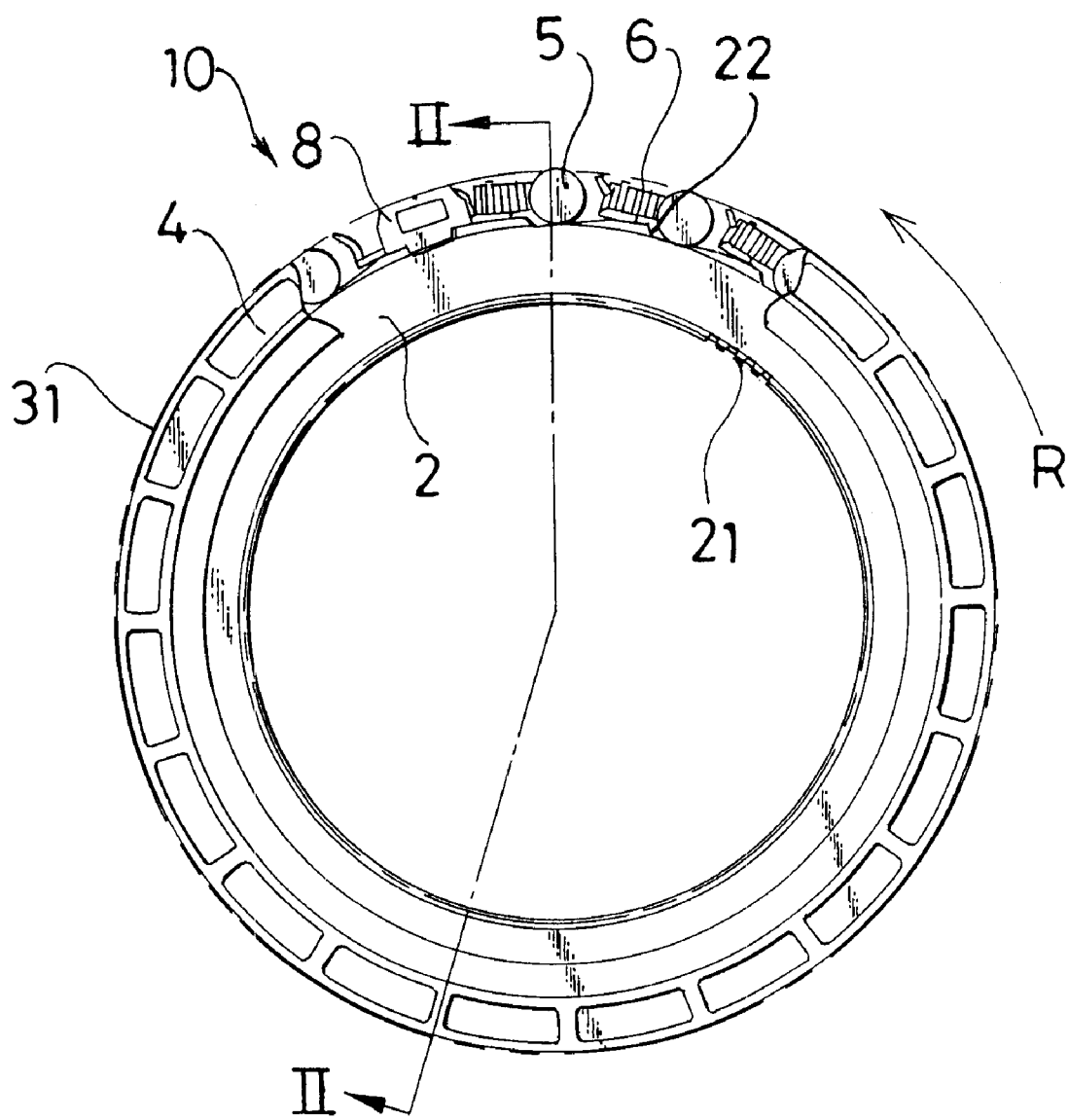
FIG. 1 is a front view of a one-way clutch apparatus according to one embodiment of the present invention, in which a flange has been cut off at a part thereof.

Referring first to FIG. 1, the one-way clutch apparatus according to the one embodiment of the present invention will be described. The drawing shows a one-way clutch 10 making use of rollers 5 as torque-transmitting members, an inner ring 2, splines 21 formed on an inner peripheral wall of the inner ring 2, a cam surface 22 formed on an outer peripheral surface of the inner ring 2, a raceway surface 31 of an outer ring not illustrated in the drawing, a resin-made retainer 4, and block bearings 8 defining a distance between the inner ring 2 and the unillustrated outer ring. Now assume that in the illustrated embodiment, the inner ring is held stationary. When the outer ring is rotated in a direction indicated by arrow R in the drawing, the outer ring idles. When the outer ring is rotated in an opposite direction (clockwise), the outer ring and the inner ring are fixed with each other.

Figure 2:
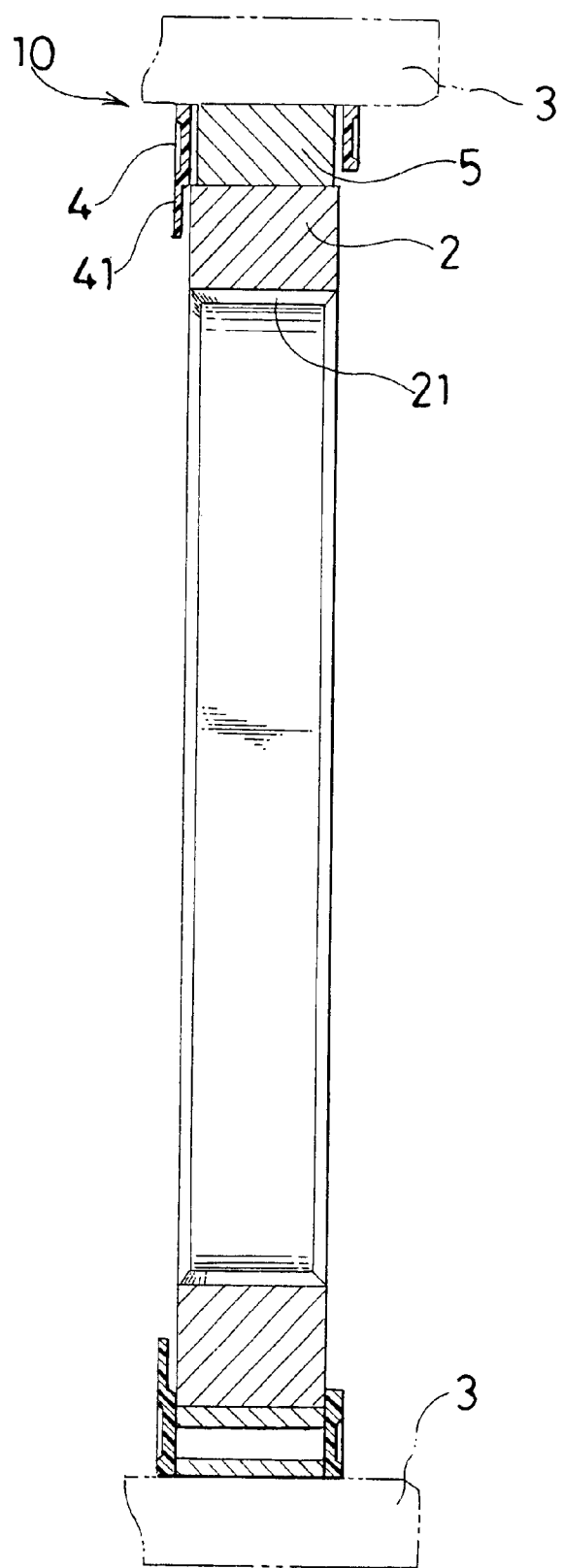
FIG. 2 is a cross-sectional view of the one-way clutch apparatus taken in the direction of arrows II—II of FIG. 1.

Reference is next had to FIG. 2, which illustrates the inner ring 2, the splines 21 formed on the inner peripheral wall of the inner ring 2, flanges 41 of the retainer 4, and rollers 5. An outer ring 3 is indicated by double-dashed lines in FIG. 2 to show its positional relationship, although the outer ring 3 is not shown in FIG. 1.

Figure 3:
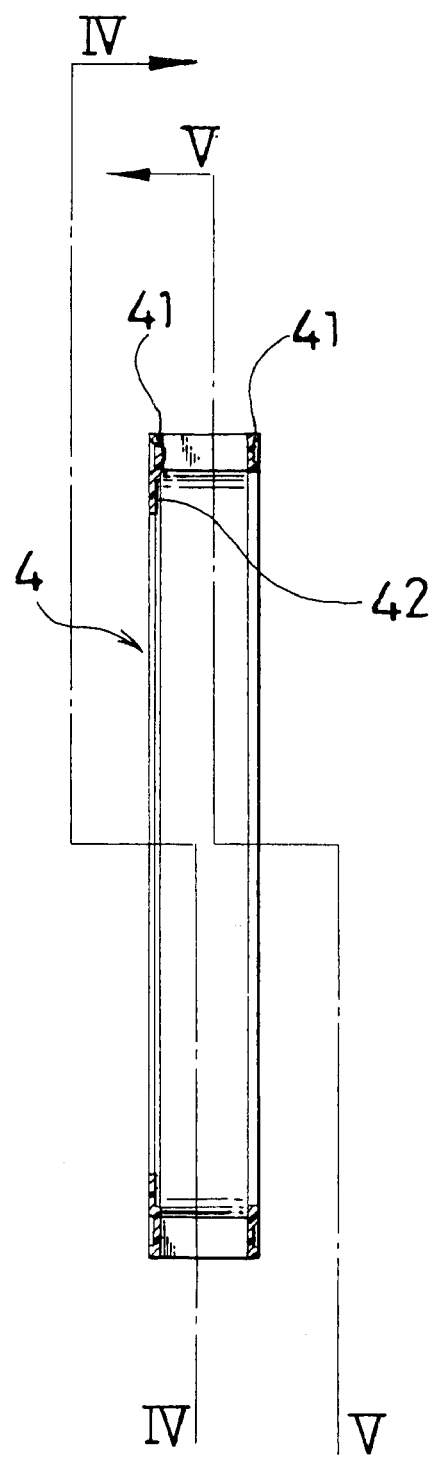
FIG. 3 is a side cross-sectional view of a retainer taken in the direction of arrows III—III of FIGS. 4 and 5.
Figure 4:
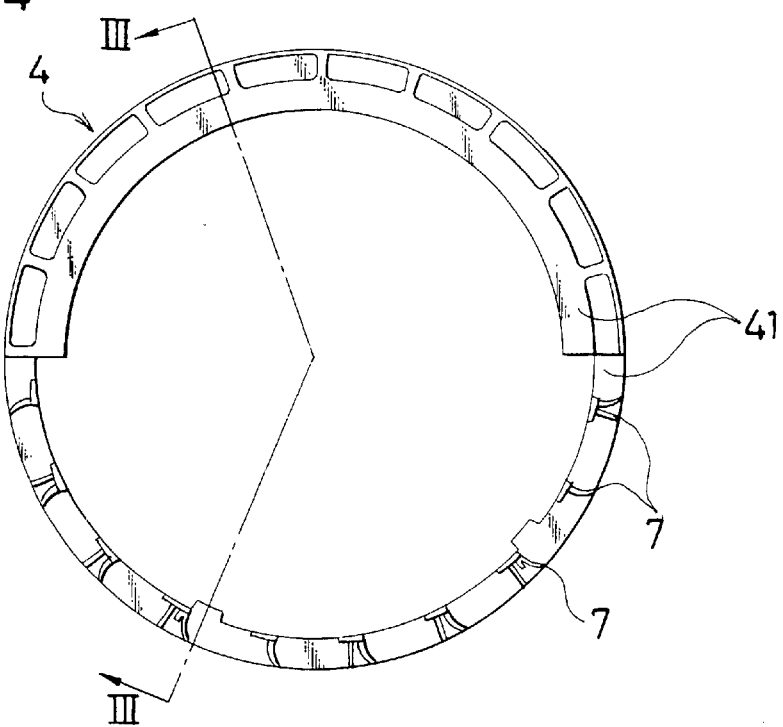
FIG. 4 is a cross-sectional view of the retainer taken in the direction of arrows IV—IV of FIG. 3.
Figure 5:
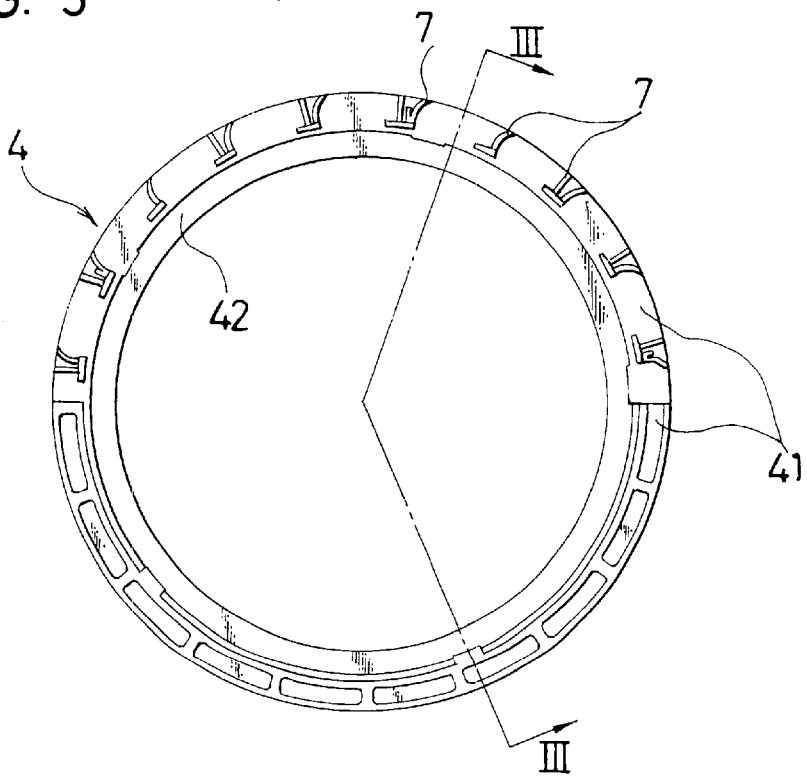
FIG. 5 is a cross-sectional view of the retainer taken in the direction of arrows V—V of FIG. 3.

With reference to FIGS. 3, 4 and 5, the construction of the retainer 4 will next be described. These drawings depict the flanges 41 of the retainer 4, an annular recess 42 formed at a radially inner side of an inner side wall of the left flange 41, and spring-fixing pins formed between the left and right flanges.

Figure 6:
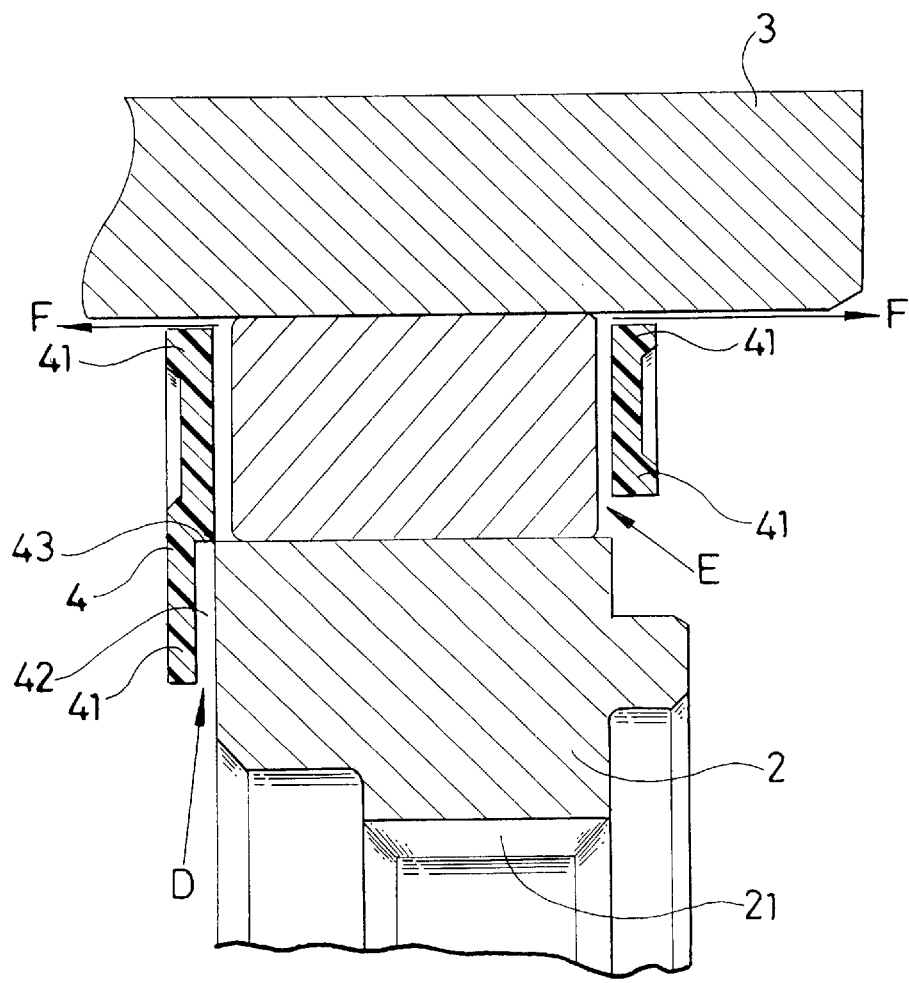
FIG. 6 is an enlarged fragmentary cross-sectional view of the one-way clutch apparatus of FIG. 2.
Figure 7:
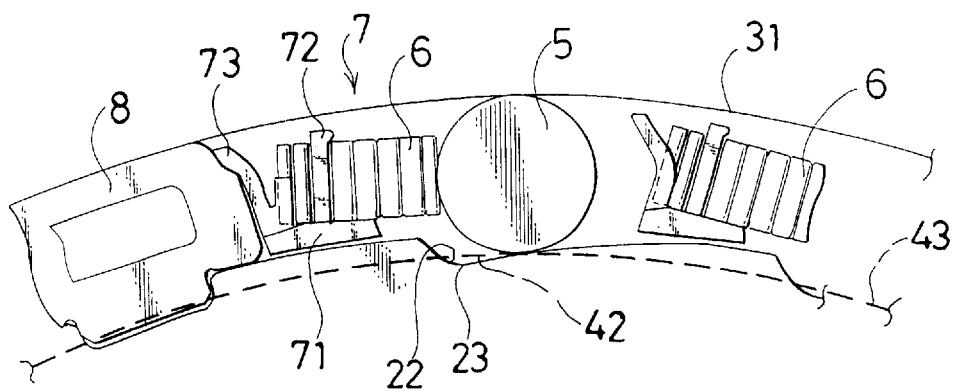
FIG. 7 is an enlarged fragmentary front view of the one-way clutch apparatus of FIG. 1.
Figure 8:
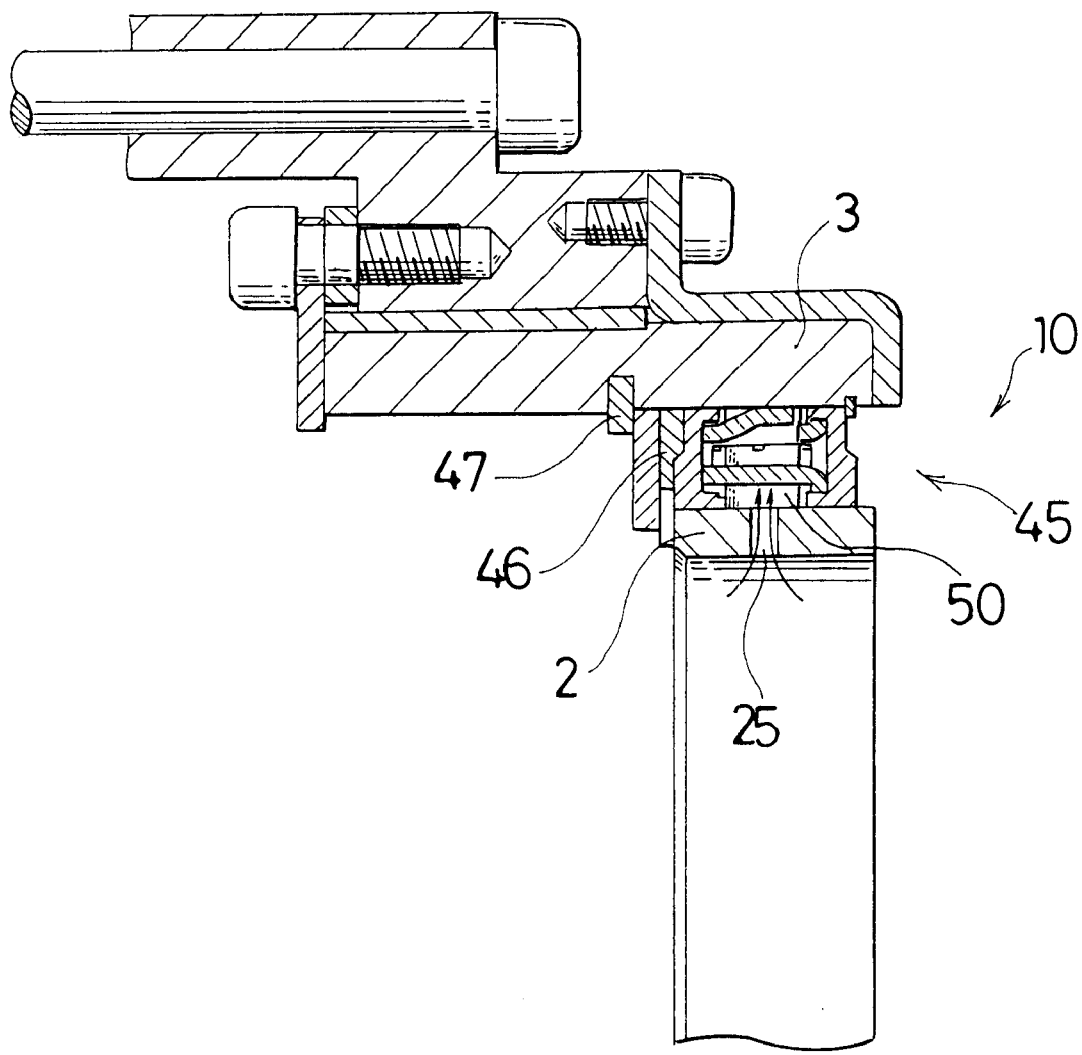
FIG. 8 is a fragmentary cross-sectional view of a conventional one-way clutch.

FIGS. 6 and 7 illustrate the inner ring 2, the splines 21 formed on the inner peripheral wall of the inner ring 2, the outer ring 3, the flanges 41 of the retainer 4, the annular recess 42 formed at the radially inner side of the inner side wall of the left flange 41, an outer peripheral end wall 43 of the annular recess 42, the rollers 5, the springs 6, the spring-fixing pins 7, and the block bearing 8 defining the distance between the inner ring 2 and the outer ring 3. On the outer peripheral wall of the inner ring 2, the cam surface 22 is formed to be brought into engagement with the rollers 5.

A description will next be made with reference to FIG. 7. Now assume that the inner ring 2 is held stationary. When the outer ring 3 is rotated in a counterclockwise direction (the direction R in FIG. 1), the outer ring 3 idles because of the relationship between the rollers 5 and the cam surface 22. When the outer ring 3 is rotated conversely in the clockwise direction, the rollers 5 run onto the cam surface 22 so that the outer ring 3 and the inner ring 2 are fixed with each other.

In FIG. 7, the position of the outer peripheral end wall 43 of the annular recess 42 is indicated by a dashed circle. The outer peripheral end wall 43 is located on a radially outer side of the cam surface 22 of the inner ring 2 only at deepest parts 23 of the cam surface 22. Accordingly, the rollers 5 and the inner ring 2 are sufficiently supported by the retainer 4, and between the outer peripheral end wall 43 of the annular recess 42 and the deepest parts 23 of the cam surface 22, lube oil sufficiently flows in around the rollers 5. It is, therefore, possible to stabilize the support of the torque-transmitting members while surely establishing a lube oil supply passage.

Designated at numeral 6 are corrugated springs, which urge their associated rollers 5 as torque-transmitting members. Numeral 7 indicates the pins, which support their associated springs 6. A seat portion 71 of each pin 7 is molded integrally with the flanges 41,41 to form the retainer 4. Designated at numeral 72 are spring-supporting portions, which support their associated springs 6 at corrugated portions thereof. Designated at numeral 73 are holding portions, which hold their corresponding block bearings 8 as illustrated in FIG. 7. Each spring-supporting portion 72 is formed at a free end thereof into a slightly enlarged shape to prevent the associated spring from falling off.

Reference is again had to FIG. 6. On the left side of the roller 5, lube oil enters the annular recess 42 of the flange 41 as indicated by arrow D, and between the outer peripheral end wall 43 of the annular recess 42 and the deepest part 23 of the cam surface 22 of the inner ring 2, enters around the roller 5. On the right side of the roller 5, on the other hand, lube oil flows in as indicated by arrow E. The lube oil is then discharged to the outside as indicated by arrow F.

This application claims the priority of Japanese Patent Application 2001-218908 filed Jul. 19, 2001, which is incorporated herein by reference.

What is claimed is:

1. A one-way clutch apparatus provided with a plurality of rollers interposed as torque-transmitting members between an inner ring and an outer ring and a cam surface formed on an outer peripheral wall of said inner ring such that by a combination of said cam surface and said rollers, transmission of rotating force is performed only in one direction between said inner ring and said outer ring, wherein an inner side wall of a flange of a retainer, said flange being arranged alongside said rollers and inner ring, is provided on a radially inner side thereof with an annular recess, and an outer peripheral end wall of said annular recess is located on a radially outer side of said cam surface of said inner ring only at deepest parts of said cam surface to permit supply of lube oil to said rollers through said annular recess of said flange and said deepest parts of said cam surface.

2. A one-way clutch apparatus according to claim 1, wherein said retainer is made of a resin.

* * * * *